Figure 1:
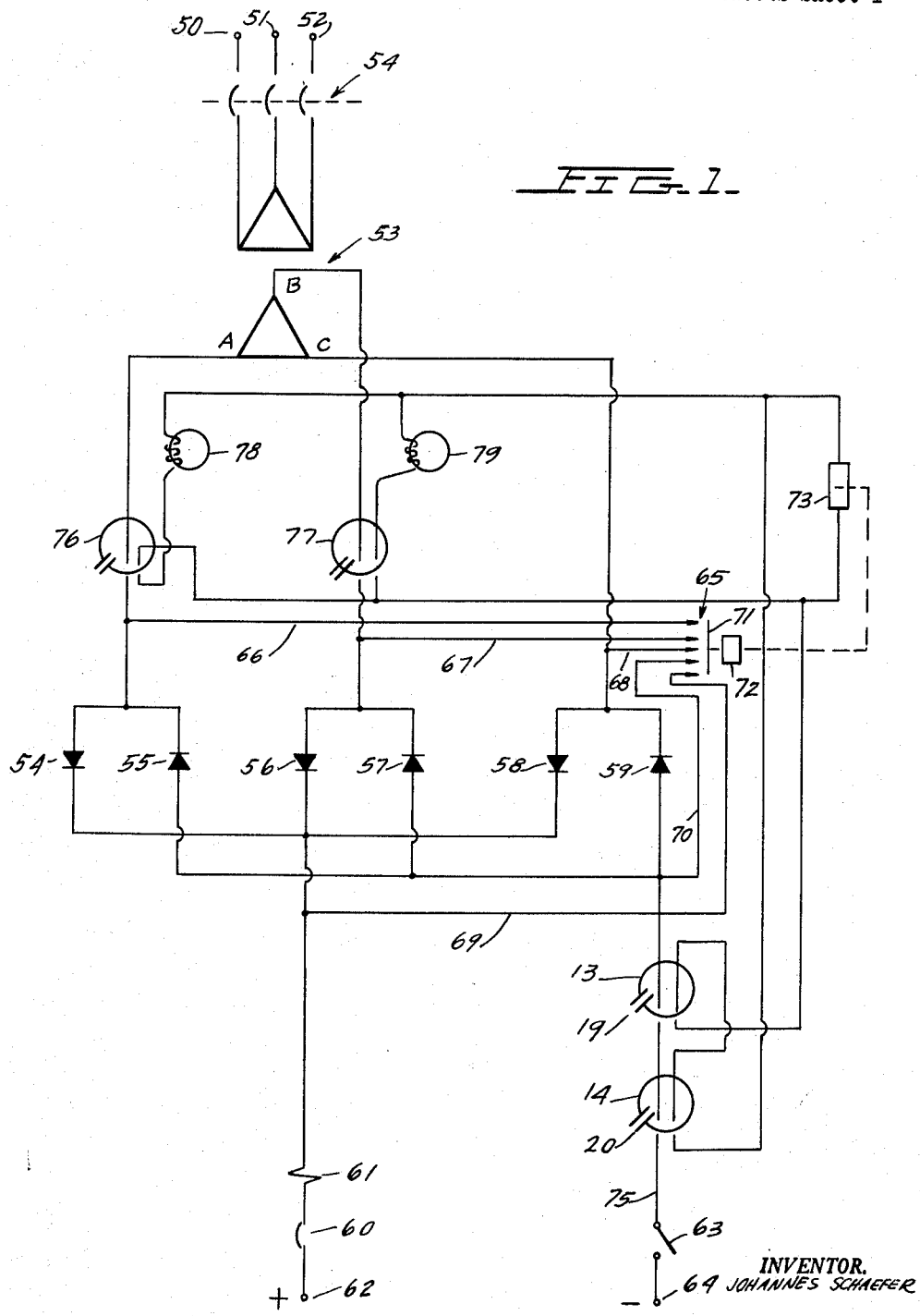

March 31, 1964 J. SCHAEFER 3,127,543
FAULT CURRENT SENSING MEANS
Filed Aug. 30, 1960 2 Sheets-Sheet 1

INVENTOR.
JOHANNES SCHAEFER
BY
OSTROLENK, FABER, GERB & SOFFEN
ATTORNEYS

United States Patent Office 3,127,543
Patented Mar. 31, 1964

3,127,543
FAULT CURRENT SENSING MEANS
Johannes Schaefer, Philadelphia, Pa., assignor to I-T-E Circuit Breaker Company, Philadelphia, Pa., a corporation of Pennsylvania
Filed Aug. 30, 1960, Ser. No. 52,810
7 Claims. (Cl. 317—27)

This invention relates to a current sensing device and more specifically relates to a magnetic structure for generating a signal responsive to predetermined conditions such as an overload or short circuit current.

Current sensing devices are widely used throughout the electrical industry and, typically, are used in applications where electrical equipment is to be somehow protected by protective means during electrical fault conditions. By way of example, a circuit breaker must be operated responsive to overload or short circuit conditions. Thus, some type of sensing means is required to initiate their operation. In like manner, the rectifier element of a rectifier circuit should be immediately protected, responsive to fault conditions in its circuit as by causing a short circuiter to become operative to short circuit the rectifier elements during fault conditions.

In the latter capacity where the circuit elements are semiconductor rectifiers, extremely high speed operation is necessary because of the low overload capacity of the elements.

Many systems have been proposed for quickly initiating the operation of such devices. By way of example, in copending application, Serial No. 641,301, filed February 20, 1957, in the name of Edward John Diebold, entitled "Instantaneous Trip for Rectifier Protection," now U.S. Patent No. 2,971,146, and assigned to the assignee of the present invention, a short circuiter receives a tripping impulse directly from a saturable core connected in a D.-C. portion of the rectifier circuit. A bias may be provided for this device to keep it saturated so long as there is normal current flow in the circuit to which it responds. When, however, there is an increase in the current through the circuit beyond some predetermined value, the bias is overcome so that there will be a flux change which delivers a signal for operating a short circuiter.

A current transformer which operates in this manner requires a substantial number of biasing ampere turns and requires a special stabilized power supply for the bias current. The present invention provides a novel magnetic signaling system which will generate an output signal responsive to current value and its rate of rise through the circuit driving the system. Thus, my novel circuit does not require a biasing means or a power supply therefore. The output signal is a function of current value and its rate of rise which can be used in any predetermined desirable ratio by adjusting the air gaps.

Furthermore, since the novel structure is sensitive to the rate of rise of current, under relatively low overloads the output will be low, while under high rate of rise of current, the output will be high as soon as a certain instantaneous value of current is achieved. However, below the current where the two characteristics start to separate, a high rate of rise will not produce any output.

These novel features are achieved in an inexpensive manner in a circuit requiring a minimum of components including a first and second magnetic core. Each of the first and second cores have a primary winding driven by the circuit which is to be protected and respective output windings connected with such polarity that their outputs oppose one another. The output characteristic of the cores are then controlled as by different lengths of air gaps in the cores and either a different number of turns on each core or a different cross-sectional area of the cores so that up to some predetermined value of current in the primary circuit their outputs will be substantially identical and in opposition. Accordingly, up until this predetermined current value, the net output of the series connected output windings of the two cores will be zero.

The first of the magnetic cores is so constructed that it is saturated when the predetermined current is achieved, while the second core remains magnetically unsaturated. Accordingly, once the predetermined current is achieved, the output circuit will see the unopposed voltage appearing across the output winding of the unsaturated second core.

It will be apparent that this concept as such is not limited to unidirectional circuits but may be used in A.-C. circuits as well.

Furthermore, since the circuit is sensitive to rate of rise of current, when the current being measured increases relatively slowly, a relatively low output voltage will be generated after the predetermined current is exceeded in view of the slow change of magnetic flux of the remaining unsaturable core. On the other hand, if there is a severe fault condition, an exceedingly high voltage pulse will be generated by the unsaturated core since the other core saturates at the instantaneous value of the predetermined current. Thus, under severe fault conditions, a strong signal is immediately generated, while under a low rate of rise the signal will only be strong if the absolute current value also is very high.

The time required for the current to reach a certain absolute dangerous value is longer when the rate of rise is slower or when the rate of rise starts at a lower value. Thus an arrangement is used whereby adjustments result in the time interval from the time the current starts to increase from a value where the signal is strong enough to trip till the time the current reaches a value dangerous for the circuit is more than the mechanical delay of the circuit breaker or short circuiter. Thus the system can be extremely sensitive since the maximum delay of tripping and tripping pulse is possible resulting in tripping only if actual danger to the parts exist.

In view of the foregoing, a primary object of this invention is to provide a novel fault indicating circuit.

Another object of this invention is to provide a novel circuit means for generating a signal responsive to predetermined current conditions which is inexpensive and highly reliable.

A further object of this invention is to provide means for delivering an output signal responsive to predetermined electrical conditions of the core.

Another object of my invention is to provide an inverse selective fault current device with fast tripping if the rate of rise is high and a delay if the rate of rise is slow. The delay being a function of the current before the fault and the rate of rise thereafter.

These and other objects of this invention will become apparent from the following description taken in connection with the drawings in which:

FIGURE 1 shows a three phase full wave rectifier system incorporating the novel sensing devices of the invention which controls a short circuiter.

Figure 2:
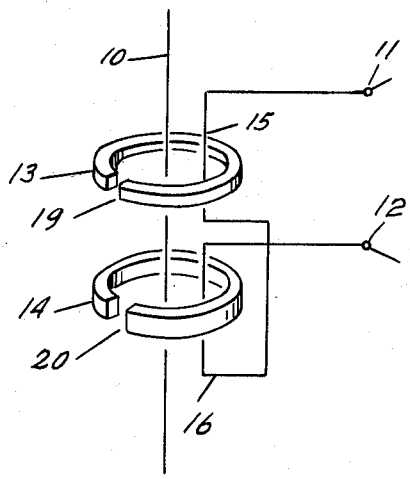

FIGURE 2 specifically shows the sensing device of the invention.

Figure 3:
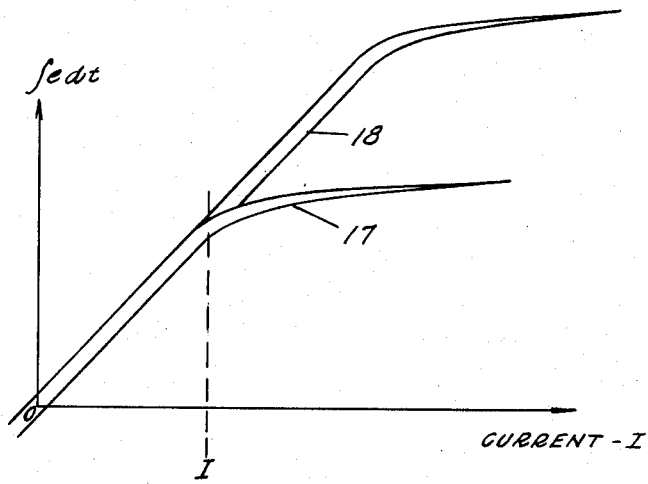

FIGURE 3 shows the output curves of the first and second magnetic cores of the invention.

Referring first to FIGURES 2 and 3, a conductor 10 carries a current I plotted on the horizontal axis of FIGURE 3. An output signal is to be generated at terminals 11 and 12 which are connected to some utilization circuit such as the trip means of a protective device when the current in conductor 10 exceeds some predetermined instantaneous value.

To achieve this in a novel and simple manner, a first and second core 13 and 14 respectively, encircle conductor 10 so that the conductor acts as a primary winding for these cores. Each of cores 13 and 14 then have output windings 15 and 16 respectively (shown as single turn windings for purposes of illustration).

Windings 15 and 16 are then connected in series with terminals 11 and 12 and their polarities are such that the voltage generated by winding 15 will be in opposition to the voltage generated in winding 16. Thus, the net output signal to terminals 11 and 12 will be the difference between voltage of windings 15 and 16.

Cores 13 and 14 are then constructed in such a manner that their outputs will be identical up to some current value such as current value $I$, of current conductor 10, illustrated in FIGURE 3. That is to say, the same voltage is delivered by the cores up until the value $I$.

In the preferred embodiment of the invention, core 13 saturates as shown in curve 17 of FIGURE 3 at the value $I$. The core 14, however, does not saturate until a substantially greater value, as illustrated in curve 18, in FIGURE 3. This can be achieved by appropriate control of the cross sectional area of cores 13 and 14 or by the control of the number of turns of their secondary winding, the primary number of turns preferably being one for each core so that a straight through conductor serves as the primary winding for both cores.

During currents increase from zero value to $I$, the slope of curves 17 and 18 are made identical by control of appropriate air gaps 19 and 20 of cores 13 and 14 respectively. Accordingly, the output signals of cores 13 and 14 will be equal and opposite to one another until value $I$, so that a net zero signal is applied to terminals 11 and 12.

If under normal current conditions, the current will never exceed $I$, it is clear that no output signal will be generated. When, however, due to some fault condition, the current value $I$ in conductor 10 is exceeded, core 13 will saturate, while core 14 continues to execute a flux change so that it continues to generate a voltage. This voltage as indicated in FIGURE 3 is unbalanced and comprises the output signal to an output circuit connected at terminals 11 and 12. That is to say, the difference between curves 17 and 18 determines the output signal.

It will be apparent that this condition will apply whether the current in conductor 10 is either A.-C. or D.-C.

Furthermore, since the level $I$ is determined solely by the magnetic characteristics of cores 13 and 14, the system is independent of any external power supply.

The novel arrangement controls the tripping level in accordance with the rate of rise of current where the output circuit connected to terminals 11 and 12 is substantially resistive in nature. Thus, a rapid rate of change of current will produce the required tripping current within a very short time after the current $I$ is exceeded, while a relatively low rate of change of current though conductor 10 will not deliver the required tripping current until $I$ is substantially exceeded, so that a time lag is achieved.

The manner in which the invention may be applied to a multiphase rectifier system is set forth in FIGURE 1.

Referring now to FIGURE 1, the rectifier system is connected to a source of three phase power at terminals 50, 51 and 52 and is connected to a power transformer 53 through the A.-C. circuit breaker 54. The secondary winding of transformer 53 is connected to rectifier elements 54 through 59 in the standard manner. Rectifier elements 54 through 59 may be of any desired type, such as germanium or silicon cells and each of the cell positions could be comprised of any desired number of parallel connected and series connected elements to satisfy the voltage and current requirements of the circuit. Cells 54, 56 and 58 are then connected together by a common bus and are connected in series with a D.-C. circuit breaker 60 having trip means 61 and positive output D.-C. terminal 62. Cells 55, 57 and 59 are similarly connected to a common bus and are taken out through disconnect switch 63 to a negative D.-C. terminal 64.

In the event of a fault condition somewhere within the system of FIGURE 1 or due to the failure of some of the cells associated therewith, it is extremely important to protect the remaining cells as rapidly as possible because of their low overload capacity. To this end, a short circuiter means 65 is provided to permit simultaneous connection between each of the A.-C. phases and each of the D.-C. buses. The short circuiter can, for example, be of the type set forth in above noted copending U.S. application, Serial No. 641,108, or could be of the type shown in U.S. Patent 2,888,538, entitled "Explosive Type Short-Circuiter" to Jensen, issued May 26, 1959, and assigned to the assignee of the present invention.

Thus, as is schematically illustrated in FIGURE 1, conductors 66, 67 and 68 are connected to the three phases respectively and conductors 69 and 70 are connected to the two output D.-C. buses. Each of conductors 66 through 70 are then terminated by contact means adjacent a common contact means 71. This common contact means 71 of short circuiter 65 is under the control of an operating means 72 which is operable to cause contact means 71 to electrically interconnect the terminals of conductors 66 through 70 to cause short circuiting of all of the cells 54 through 59 under predetermined fault conditions.

The operating means 72 is energized from energizable means 73 which is connected at the output of the fault sensing means of the invention. Thus, where an appropriate output is received by means 73, operating means 72 will cause contact means 71 to interconnect the A.-C. and D.-C. buses, whereby cells 54 through 59 will be short circuited responsive to fault conditions until the relatively slower protective devices 54 and 60 are operated to remove the circuit from the line.

In accordance with present invention and in order to generate a signal in sensing device 73 responsive to fault conditions, the cores 13 and 14 of FIGURE 2 may be placed about the negative bus 75, as is schematically illustrated in FIGURE 1. Note that in FIGURE 1 the air gaps 19 and 20 are also schematically illustrated.

In operation, if the current in negative bus 75 exceeds the absolute value of current $I$, of FIGURE 3, then it is clear that an impulse will be applied to sensing means 73. This current can be either a forward fault current or a reverse current fault. In either case, there will be rapid operation of short circuiter 65 to protect cells 54 through 59 until the fault can be cleared by either the A.-C. interrupting equipment 54 or the D.-C. interrupting equipment 60.

The circuit of FIGURE 1 additionally shows a sensing circuit including magenetic cores 76 and 77 and saturable type reactors 78 and 79. This circuit is operable to generate a signal to sensing means 73 in the event of a fault in the A.-C. circuit, as is fully described in my copending U.S. application Serial No. 52,885, filed August 30, 1960, entitled: "Circuit for Overcurrent Detection," and assigned to the assignee of the present invention. Reference is made to that application for details to the operation of the circuit, it being noted that the output generated by cores 76 and 77 will be blocked by cores 78 and 79 until they saturate, at which time an impulse is applied to sensing means 73.

This latter circuit will be operable due to faults existing within the A.-C. portion of the circuit which are not sensing in the D.-C. bus. It is, however, to be fully understood that the circuit, including cores 13 and 14, could be operable in the A.-C. circuit in place of cores such as cores 67 and 68 and is shown as applied to the D.-C. circuit for purposes of illustration only.

Furthermore, under appropriate conditions, the novel circuit of the present invention, which includes cores 13 and 14, could be connected in the primary circuit of transformer 53 since the circuit is operable either under A.-C. or D.-C. conditions.

Although I have described preferred embodiments of my novel invention, many variations and modifications will now be obvious to those skilled in the art, and I prefer therefore to be limited not by the specific disclosure herein but only by the appended claims.

I claim:

1. A fault current sensing means for an electrical conductor, said fault current sensing means comprising a first and second magnetic core having a first and second output winding thereon; said first and second magnetic cores being magnetically coupled to at least a portion of the current carried by said electrical conductor; said first magnetic core being magentically saturated when the current through said electrical conductor exceeds a predetermined value; said second magentic core being magnetically saturated when the current through said electrical conductor reaches a value substantially higher than said predetermined value; said first and second output windings having output voltages induced therein during a change in flux in said first and second magnetic core respectively; a fault sensing device said first and second windings being connected in series with one another and with said fault sensing device and in opposite polarity relation whereby the output voltage of said first winding opposes the output voltage of said second winding.

2. A fault current sensing means for an electrical conductor, said fault current sensing means comprising a first and second magnetic core having a first and second output winding thereof; said first and second magnetic cores being magnetically coupled to at least a portion of the current carried by said electrical conductor; said first magnetic core being magnetically saturated when the current through said electrical conductor exceeds a predetermined value; said second magnetic core being magnetically saturated when the current through said electrical conductor reaches a value substantially higher than said predetermined value; said first and second output windings having output voltages induced therein during a change in flux in said first and second magnetic core respectively; a fault sensing device said first and second windings being connected in series with one another and with said fault sensing device and in opposite polarity relation whereby the output voltage of said first winding opposes the output voltage of said second winding; said output voltage of said first winding being substantially equal to the output voltage of said second winding until said first magnetic core saturates.

3. A fault current sensing means for an electrical conductor, said fault current sensing means comprising a first and second magnetic core having a first and second output winding thereon; said first and second magnetic cores being magnetically coupled to at least a portion of the current carried by said electrical conductor; said first magnetic core being magnetically saturated when the current through said electrical conductor exceeds a predetermined value; said second magnetic core being magnetically saturated when the current through said electrical conductor reaches a value substantially higher than said predetermined value; said first and second output windings having output voltages induced therein during a change in flux in said first and second magnetic core respectively; a fault sensing device said first and second windings being connected in series with one another and with said fault sensing device and in opposite polarity relation whereby the output voltage of said first winding opposes the output voltage of said second winding; each of said first and second magnetic cores having an air gap; said first and second air gaps adjusting said first and second magnetic cores whereby said output voltage of said first winding being substantially equal to the output voltage of said second winding until said first magnetic core saturates.

4. A sensing circuit for delivering a signal to an output circuit responsive to predetermined conditions; said sensing circuit comprising a first and second magnetic core having respective first and second input windings and respective first and second output windings; said first and second input windings being electrically connected in series with one another and being connectible to carry the current to be monitored; said first and second output windings being electrically connected in series with one another and to said output circuit with opposing electrical polarities; the volt second-current characteristic of said first core and first input winding having substantially the same slope as the volt second-current characteristic of said second core and second input winding when said first and second cores are unsaturated; said first core being magnetically saturated at a first value of volt seconds; said second magnetic core being magnetically saturated at a second value of volt seconds higher than said first value; said output circuit comprising a fault sensing circuit; said fault sensing circuit being energized when said current to be monitorized exceeds a predetermined value.

5. A sensing circuit for delivering a signal to an output circuit responsive to predetermined conditions; said sensing circuit comprising a first and second magnetic core having respective first and second input windings and respective first and second output windings; said first and second input windings being electrically connected in series with one another and being connectible to carry the current to be monitored; said first and second output windings being electrically connected in series with one another and to said output circuit with opposing electrical polarities; the volt second-current characteristic of said first core and first input winding having substantially the same slope as the volt second-current characteristic of said second core and second input winding when said first and second cores are unsaturated; said first core being magnetically saturated at a first value of volt seconds; said second magnetic core being magnetically saturated at a second value of volt seconds higher than said first value; said output circuit comprising a fault sensing circuit; said fault sensing circuit being energized when said current to be monitorized exceeds a predetermined value; said current to be monitored being an alternating current.

6. A sensing circuit for delivering a signal to an output circuit responsive to predetermined conditions; said sensing circuit comprising a first and second magnetic core having respective first and second input windings and respective first and second output windings; said first and second input windings being electrically connected in series with one another and being connectible to carry the current to be monitored; said first and second output windings being electrically connected in series with one another and to said output circuit with opposing electrical polarities; the volt second-current characteristic of said first core and first input winding having substantially the same slope as the volt second-current characteristic of said second core and second input winding when said first and second cores are unsaturated; said first core being magnetically saturated at a first value of volt seconds; said second magnetic core being magnetically saturated at a second value of volt seconds higher than said first value; said output circuit comprising a fault sensing circuit; said fault sensing circuit being energized when said current to be monitorized exceeds a predetermined value; said first and second magnetic cores having air gaps therein; the value of said air gaps determining the value of said current at which said first magnetic core is magnetically saturated.

7. A sensing circuit for delivering a signal to an output circuit responsive to predetermined conditions; said sensing circuit comprising a first and second magnetic core having respective first and second input windings and respective first and second output windings; said first and second input windings being electrically connected in series with one another and being connectible to carry the current to be monitored; said first and second output windings being electrically connected in series with one another and to said output circuit with opposing electrical polarities; the volt second-current characteristic of said first core and first input winding having substantially the same slope as the volt second-current characteristic of said second core and second input winding when said first and second cores are unsaturated; said first core being magnetically saturated at a first value of volt seconds; said second magnetic core being magnetically saturated at a second value of volt seconds higher than said first value; said output circuit comprising a fault sensing circuit; said fault sensing circuit being energized when said current to be monitorized exceeds a predetermined value; said first and second magnetic cores having air gaps therein; the value of said air gaps determining the value of said current at which said first magnetic core is magnetically saturated; said first and second input windings being straight through windings.

References Cited in the file of this patent

UNITED STATES PATENTS

| | | |
|---|---|---|
| 2,734,182 | Rajchman | Feb. 7, 1956 |
| 2,960,685 | Van der Heide | Nov. 15, 1960 |